(12) United States Patent
Moon (10) Patent No.: US 7,440,069 B2
(45) Date of Patent: Oct. 21, 2008

(54) DISPLAY DEVICE AND PANEL THEREFOR

(75) Inventor: Sung-Jae Moon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/689,169

(22) Filed: Mar. 21, 2007

(65) Prior Publication Data

US 2007/0153209 A1     Jul. 5, 2007

Related U.S. Application Data

(62) Division of application No. 10/929,808, filed on Aug. 30, 2004, now Pat. No. 7,029,209.

(30) Foreign Application Priority Data

Aug. 29, 2003     (KR)     ................. 10-2003-0060295

(51) Int. Cl.
    *G02F 1/1343*     (2006.01)
(52) U.S. Cl. ...................... 349/151; 349/152
(58) Field of Classification Search ......... 349/149–152; 361/777
    See application file for complete search history.

(56) References Cited

U.S. PATENT DOCUMENTS

| | | | |
|---|---|---|---|
| 4,586,789 A | 5/1986 | Kishimoto et al. | |
| 4,985,663 A | 1/1991 | Nakatani | |
| 5,307,503 A * | 4/1994 | Okada et al. | ................. 361/816 |
| 5,499,131 A * | 3/1996 | Kim | ........................... 349/149 |
| 5,870,163 A * | 2/1999 | Watanabe et al. | ........... 349/149 |
| 6,300,997 B1 * | 10/2001 | Saito et al. | .................. 349/149 |
| 6,760,091 B2 | 7/2004 | Uehara | |
| 6,879,367 B2 * | 4/2005 | Ukita | .......................... 349/149 |
| 6,900,873 B2 * | 5/2005 | Yamazaki et al. | ........... 349/152 |
| 6,914,302 B2 | 7/2005 | Ohtani et al. | |
| 7,028,898 B2 * | 4/2006 | Chang | ......................... 235/454 |
| 2002/0000555 A1 | 1/2002 | Fujikawa et al. | |
| 2002/0044242 A1 * | 4/2002 | Kim | ............................. 349/139 |
| 2005/0012873 A1 | 1/2005 | Park et al. | |

* cited by examiner

*Primary Examiner*—James A Dudek
(74) *Attorney, Agent, or Firm*—Cantor Colburn LLP (57) ABSTRACT

A display device is provided, which includes: a display panel including a plurality of gate lines, a plurality of data lines, a plurality of switching elements connected to the gate lines and the data lines, a plurality of pixel electrodes connected to the switching elements, and a plurality of lead lines including contact portions; and a driving circuit mounted on the display panel and connected to the contact portions of the lead lines for receiving signals from an external device and to the data lines or the gate lines for applying data voltages or gate signals, wherein at least one of the lead lines has a first portion having a first width and a second portion connected to the contact portion and having a second width larger than the first width.

6 Claims, 8 Drawing Sheets

DISPLAY DEVICE AND PANEL THEREFOR

CROSS REFERENCE TO RELATED APPLICATIONS

This application is a divisional application of U.S. application Ser. No. 10/929,808 filed Aug. 30, 2004, which claims priority to and the benefit of Korean Patent Application No. 10-2003-0060295, filed on Aug. 29, 2003, both of which are incorporated by reference herein in their entirety.

BACKGROUND OF THE INVENTION (a) Field of the Invention

The present invention relates to a display device and a panel therefor.

(b) Description of Related Art

A flat panel display such as a liquid crystal display (LCD) and an organic light emitting display (OLED) includes a display panel, a plurality of drivers for driving the display panel, and a controller for controlling the drivers.

The drivers usually include a plurality of integrated circuit (IC) chips that are mounted on flexible printed circuit (FPC) films attached to the display panel or mounted directly on the display panel. The driver chips are supplied with control signals and driving voltages from a printed circuit board (PCB) that mount a plurality of circuit elements including the controller and a voltage generator.

When the driving chips are mounted directly on the display panel, a FPC film including a plurality of conductive lines is provided between the display panel and the PCB for transmitting control signals, driving voltages, and image data. The FPC film is attached to the display panel and the electrical connection between the FPC film and the driving chips is implemented by a plurality of lead lines formed on the display panel.

A conventional manufacturing method of the display device combines the PCB with the FPC film after attaching the FPC film on the display panel. In order to combine the PCB and the FPC film, portions of the conductive lines on the FPC film are exposed and at this time, static electricity may be introduced into the display panel through the exposed portions of the conductive lines to cause defects such as the disconnection of lead lines on the display panel.

In the meantime, the lead lines often include a lower Cr film and an upper Al film and they are covered with an insulating layer. In order to contact with the driving ICs, contact holes exposing portions of the lead lines are provided at the insulating layer and the exposed portions of the lead lines are covered with contact assistants for enhancing the contact with the other devices including the driving ICs and the FPC film.

At this time, the exposed portions of the upper Al film through the contact holes are removed by wet etch since Al exhibits relatively poor contact with other materials. The wet etch may form undercut that may cause the disconnection of the contact assistants at least in part and the partial disconnection may cause permanent disconnection of the lead lines under an electrostatic discharge.

In detail, when static electricity is induced from an external device into the lead lines, it is preferable that the static electricity is transferred to other devices through the contact assistants. However, the partial disconnection of the contact assistants may obstruct the rapid discharge of the static electricity to another device via the contact assistants and it gathers the electrostatic charges near the exposed portions of the lead lines. The gathered electrostatic charges may disconnect the lead lines near the exposed portions, when, in particular, the lead lines have small width.

SUMMARY OF THE INVENTION

A display device is provided, which includes: a display panel including a plurality of gate lines, a plurality of data lines, a plurality of switching elements connected to the gate lines and the data lines, a plurality of pixel electrodes connected to the switching elements, and a plurality of lead lines including contact portions; and a driving circuit mounted on the display panel and connected to the contact portions of the lead lines for receiving signals from an external device and to the data lines or the gate lines for applying data voltages or gate signals, wherein at least one of the lead lines has a first portion having a first width and a second portion connected to the contact portion and having a second width larger than the first width.

The first width of the at least one of the lead lines may be smaller than a width of other one of the lead lines, and the at least one of the lead lines may be shorter than the other one of the lead lines.

The at least one of the lead lines may include a lower film and an upper film.

The upper film may have an opening exposing a portion of the lower film.

The at least one of the lead lines may be covered with an insulating layer having a contact hole exposing the exposed portion of the lower film and the display panel may further include a contact assistant formed on the insulating layer and contacting the exposed portions of the lower film through the contact hole.

The opening of the upper film may be smaller than the contact hole.

The contact hole may have a curved edge.

A display device is provided, which includes: a display panel including a plurality of gate lines, a plurality of data lines, a plurality of switching elements connected to the gate lines and the data lines, a plurality of pixel electrodes connected to the switching elements, and a plurality of lead lines including contact portions; and a driving circuit mounted on the display panel and connected to the contact portions of the lead lines for receiving signals from an external device and to the data lines or the gate lines for applying data voltages or gate signals, wherein each of the lead lines has a first portion having a first width and a second portion connected to the contact portion and having a second width larger than a predetermined value and the first width of at least one of the lead lines is different from the second width of at least one of the lead lines.

The first widths of the lead lines may be different, and the lead lines may have different lengths such that the first widths of the longer lead lines are larger. The lead lines may have substantially the same resistance.

The second widths of the lead lines may be substantially equal to each other.

The second portions of the lead lines may have substantially the same length.

The lead lines may transmit image data and the driving circuit is connected to the data lines.

Each of the lead lines may include a lower film and an upper film.

The upper film of each of the contact portions may have an opening exposing a portion of the lower film thereof.

The lead lines may be covered with an insulating layer having contact holes exposing the exposed portions of the lower films of the contact portions and the display panel may further include a plurality of contact assistants formed on the insulating layer and contacting the exposed portions of the lower films of the contact portions through the contact holes.

The upper films may be undercut under the insulating layer at the contact holes.

The contact holes may have curved edges.

The lead lines may include the same layer as the gate lines.

The display device may further include a flexible printed circuit film attached to the display panel and including a plurality of signal lines connected to the lead lines, and a controller electrically connected to the flexible printed circuit film.

A display panel adapted to mounting a driving chip is provided, which includes: a plurality of gate lines; a plurality of data lines; a plurality of switching elements connected to the gate lines and the data lines; a plurality of pixel electrodes connected to the switching elements; and a plurality of lead lines, each lead line including a first contact portion to be connected to the driving chip, a second contact portion to be connected to an external device, a main portion connected to the second contact portion, and a subsidiary portion connected between the first contact portion and the main portion, wherein the lead lines have different lengths, the main portions of the lead lines have different widths, and the subsidiary portions of the lead lines have substantially the same width and length.

The lead lines may have substantially the same resistance.

Each of the lead lines may include a lower film and an upper film and the upper film of the contact portion of each of the lead lines may have an opening exposing a portion of the lower film.

The display device may further include: an insulating layer formed on the lead lines and having contact holes exposing the exposed portions of the lower films of the contact portions; and a plurality of contact assistants formed on the insulating layer and contacting the exposed portions of the lower films of the contact portions through the contact holes.

The upper films may be undercut at the contact holes.

The contact holes may have curved edges.

BRIEF DESCRIPTION OF THE DRAWINGS

The present invention will become more apparent by describing embodiments thereof in detail with reference to the accompanying drawing in which.

DETAILED DESCRIPTION OF EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein. Like numerals refer to like elements throughout.

In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

Then, liquid crystal displays as an example of display device according to embodiments of the present invention will be described with reference to the accompanying drawings.

Figure 1:
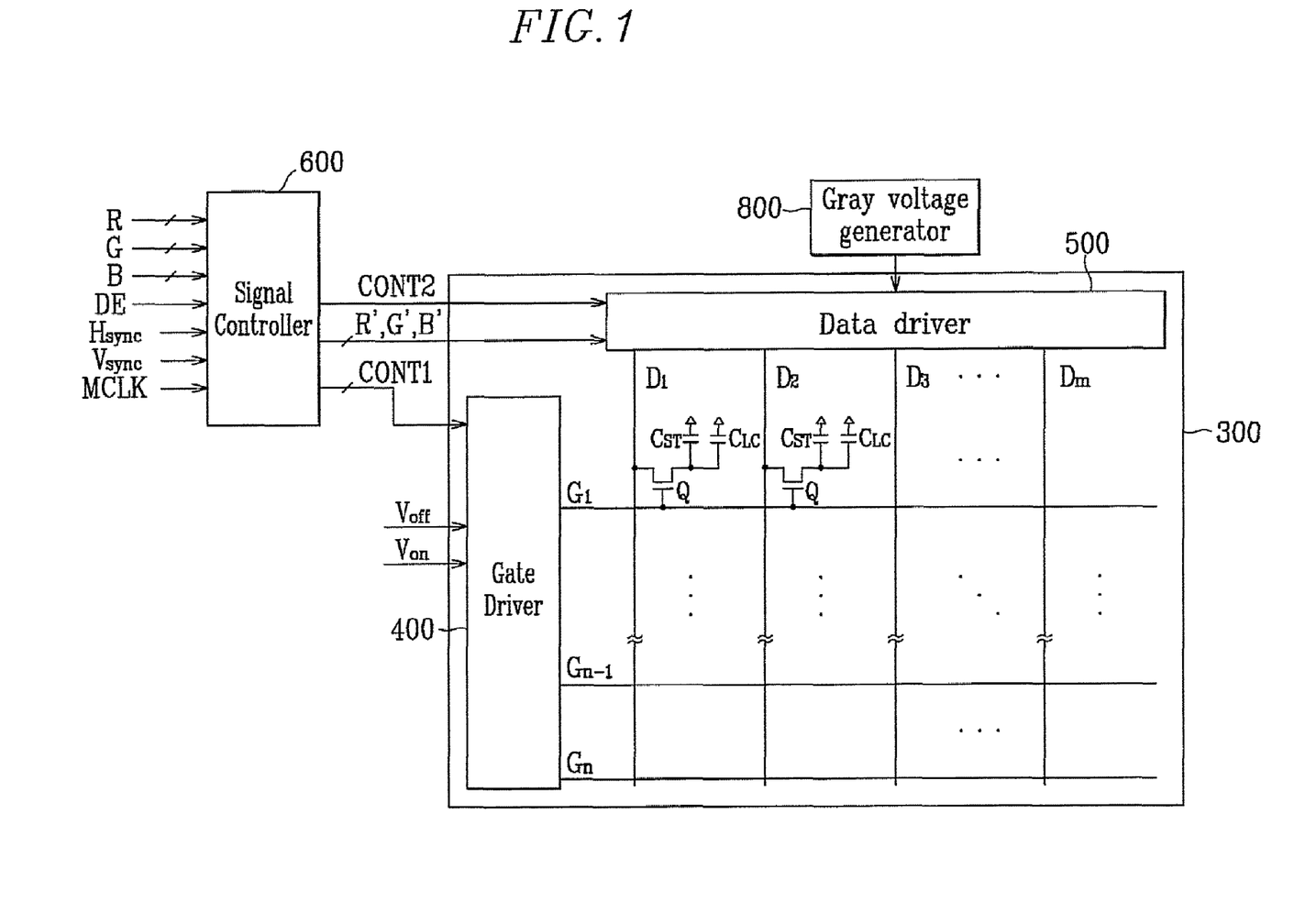
FIG. 1 is a block diagram of an LCD according to an embodiment of the present invention.
Figure 2:
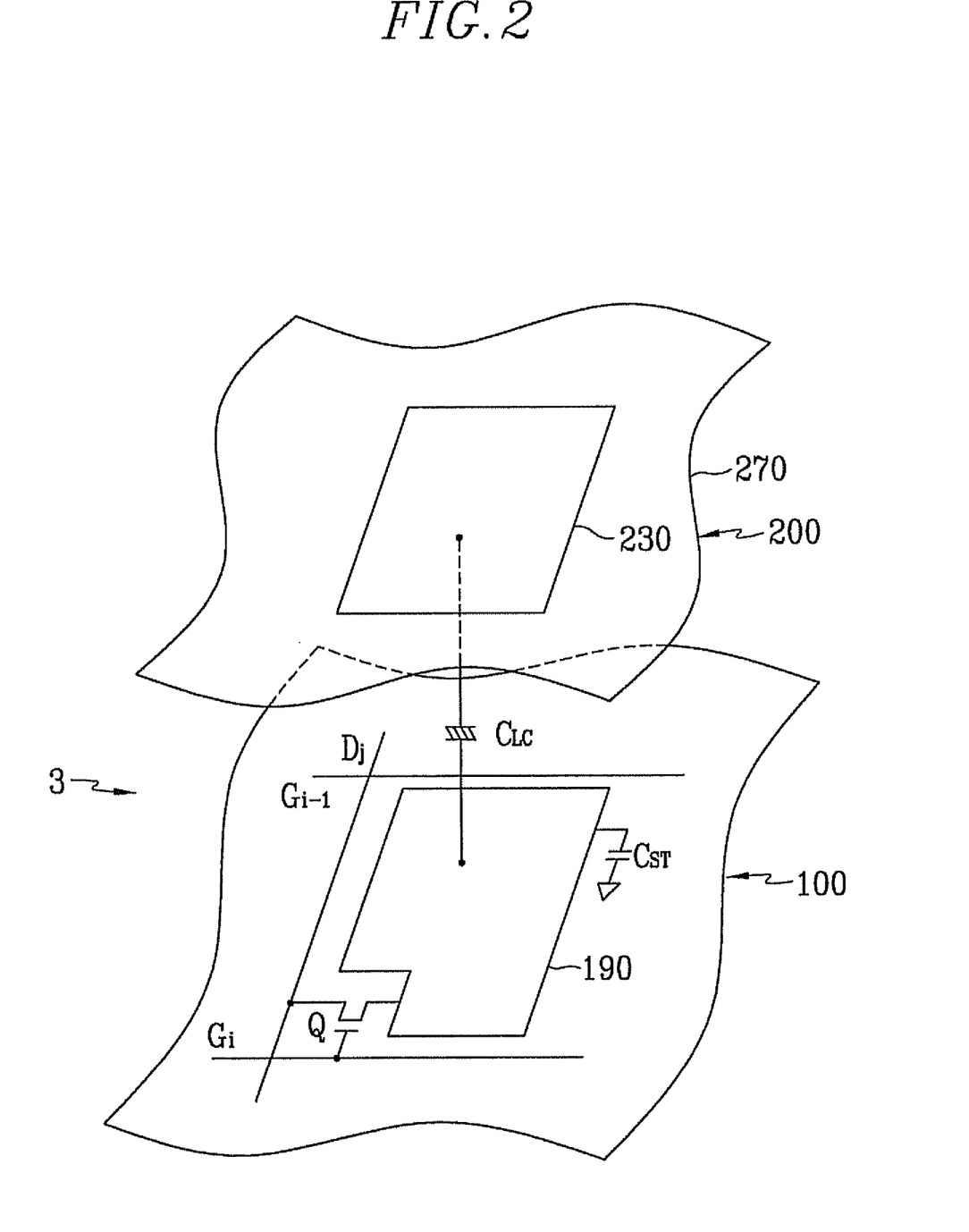
FIG. 2 is an equivalent circuit diagram of a pixel of an LCD according to an embodiment of the present invention.

FIG. 1 is a block diagram of an LCD according to an embodiment of the present invention, and FIG. 2 is an equivalent circuit diagram of a pixel of an LCD according to an embodiment of the present invention.

Referring to FIG. 1, an LCD according to an embodiment includes a LC panel assembly 300, a gate driver 400 and a data driver 500 that are connected to the panel assembly 300, a gray voltage generator 800 connected to the data driver 500, and a signal controller 600 controlling the above elements. The LCD may be an OCB mode LCD.

Referring to FIG. 1, the panel assembly 300 includes a plurality of display signal lines $G_1$-$G_n$ and $D_1$-$D_m$ and a plurality of pixels connected thereto and arranged substantially in a matrix. In a structural view shown in FIG. 2, the panel assembly 300 includes lower and upper panels 100 and 200 and a LC layer interposed therebetween.

The display signal lines $G_1$-$G_n$ and $D_1$-$D_m$ are disposed on the lower panel 100 and include a plurality of gate lines $G_1$-$G_n$ transmitting gate signals (also referred to as "scanning signals"), and a plurality of data lines $D_1$-$D_m$ transmitting data signals. The gate lines $G_1$-$G_n$ extend substantially in a row direction and substantially parallel to each other, while the data lines $D_1$-$D_m$ extend substantially in a column direction and substantially parallel to each other.

Each pixel includes a switching element Q connected to the signal lines $G_1$-$G_n$ and $D_1$-$D_m$, and a LC capacitor $C_{LC}$ and a storage capacitor $C_{ST}$ that are connected to the switching element Q. If unnecessary, the storage capacitor $C_{ST}$ may be omitted.

The switching element Q including a TFT is provided on a lower panel 100 and has three terminals: a control terminal connected to one of the gate lines $G_1$-$G_n$; an input terminal connected to one of the data lines $D_1$-$D_m$; and an output terminal connected to both the LC capacitor $C_{LC}$ and the storage capacitor $C_{ST}$.

The LC capacitor $C_{LC}$ includes a pixel electrode 190 provided on the lower panel 100 and a common electrode 270 provided on an upper panel 200 as two terminals. The LC layer 3 disposed between the two electrodes 190 and 270 functions as dielectric of the LC capacitor $C_{LC}$. The pixel electrode 190 is connected to the switching element Q, and the common electrode 270 is supplied with a common voltage Vcom and covers an entire surface of the upper panel 200. Unlike FIG. 2, the common electrode 270 may be provided on the lower panel 100, and both electrodes 190 and 270 may have shapes of bars or stripes.

The storage capacitor $C_{ST}$ is an auxiliary capacitor for the LC capacitor $C_{LC}$. The storage capacitor $C_{ST}$ includes the pixel electrode 190 and a separate signal line, which is provided on the lower panel 100, overlaps the pixel electrode 190 via an insulator, and is supplied with a predetermined voltage such as the common voltage Vcom. Alternatively, the storage capacitor $C_{ST}$ includes the pixel electrode 190 and an adjacent gate line called a previous gate line, which overlaps the pixel electrode 190 via an insulator.

For color display, each pixel can represent its own color by providing one of a plurality of red, green and blue color filters 230 in an area corresponding to the pixel electrode 190. The color filter 230 shown in FIG. 2 is provided in the corresponding area of the upper panel 200. Alternatively, the color filters 230 are provided on or under the pixel electrode 190 on the lower panel 100.

A polarizer or polarizers (not shown) are attached to at least one of the panels 100 and 200.

Referring to FIG. 1 again, the gray voltage generator 800 generates two sets of a plurality of gray voltages related to the transmittance of the pixels. The gray voltages in one set have a positive polarity with respect to the common voltage Vcom, while those in the other set have a negative polarity with respect to the common voltage Vcom.

The gate driver 400 is connected to the gate lines $G_1$-$G_n$ of the panel assembly 300 and synthesizes the gate-on voltage Von and the gate-off voltage Voff from an external device to generate gate signals for application to the gate lines $G_1$-$G_n$. The gate driver 400 is mounted on the panel assembly 300 and it may include a plurality of ICs (integrated circuits).

The data driver 500 is connected to the data lines $D_1$-$D_m$ of the panel assembly 300 and applies data voltages, which are selected from the gray voltages supplied from the gray voltage generator 800, to the data lines $D_1$-$D_m$. The data driver 500 is also mounted on the panel assembly 300 and it may include a plurality of ICs, too.

The ICs of the drivers 400 and 500 may be on flexible printed circuit (FPC) films in a TCP (tape carrier package) type which are attached to the LC panel assembly 300. Alternately, the ICs may be integrated into the panel assembly 300 along with the display signal lines $G_1$-$G_n$ and $D_1$-$D_m$ and the TFT switching elements Q.

The signal controller 600 controls the gate driver 400 and the gate driver 500 and it may be mounted on a printed circuit board (PCB).

Now, an example of a detailed configuration of the drivers and the LC assembly is described in detail with reference to FIGS. 3 and 4.

Figure 3:
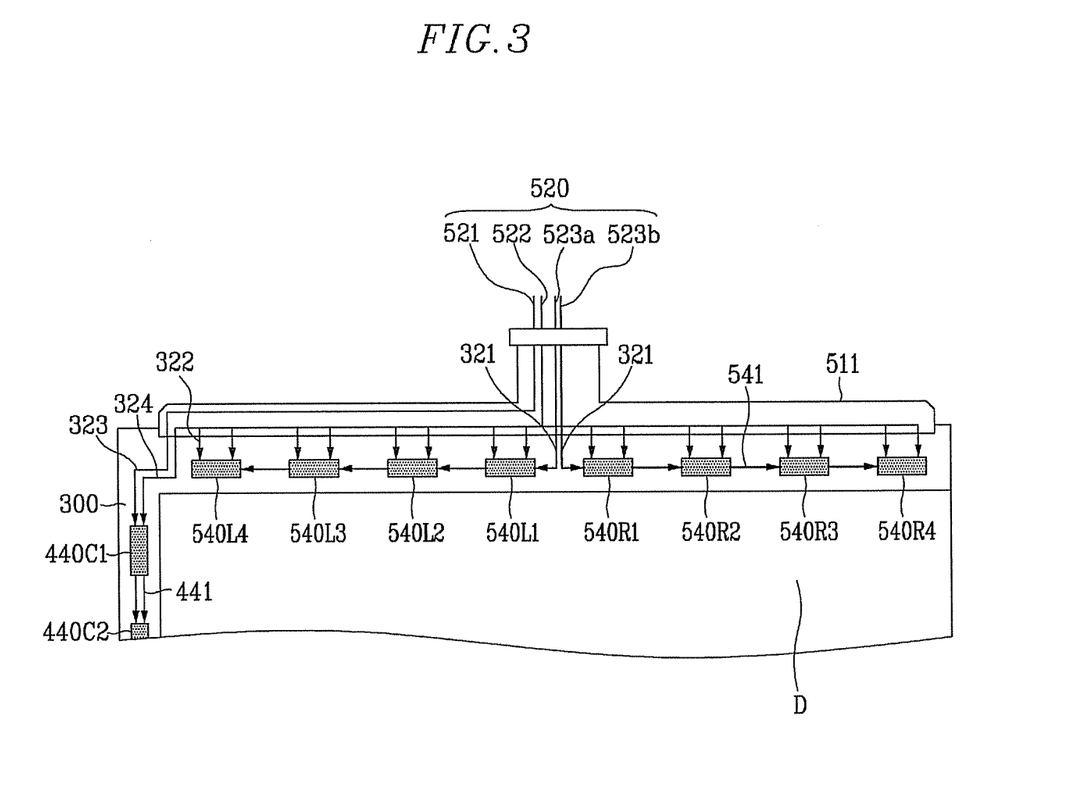
FIG. 3 is a schematic diagram illustrating an example of a detailed configuration of the drivers and the LC panel assembly shown in FIG. 1.
Figure 4:
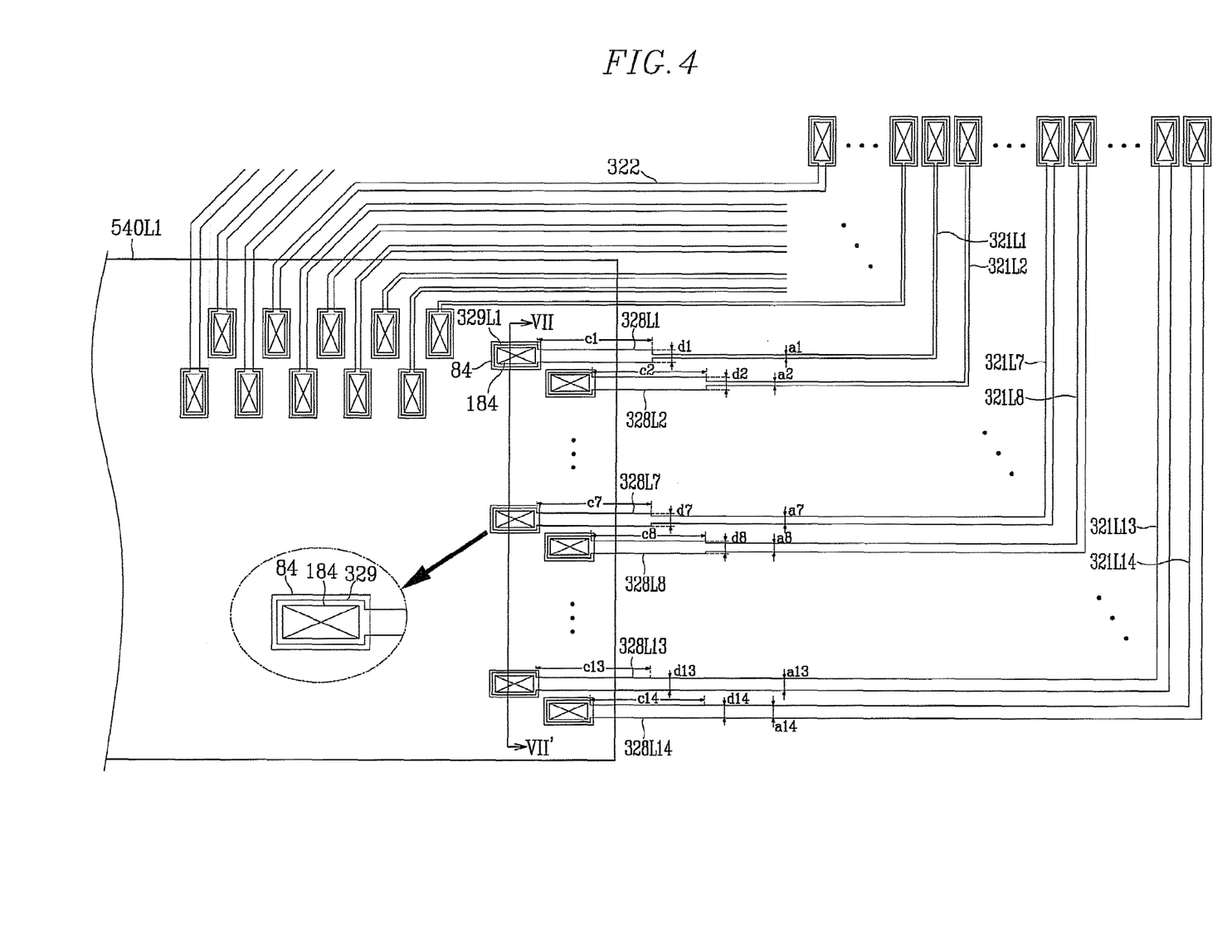
FIG. 4 is an expanded layout view of a portion of the LC panel assembly near a data driving IC shown in FIG. 3.

FIG. 3 is a schematic diagram illustrating an example of a detailed configuration of the drivers and the LC panel assembly shown in FIG. 1, and FIG. 4 is an expanded layout view of a portion of the LC panel assembly near a data driving IC shown in FIG. 3.

Referring to FIG. 3, the panel assembly 300 has a display area D for displaying images defined by intersections of the gate lines $G_1$-$G_n$ and the data lines $D_1$-$D_m$ and a peripheral area disposed outside of the display area D.

A plurality of data driving ICs 540L1-540L4 and 540R1-540R4 are mounted in a row on the peripheral area of the panel assembly 300 and they are disposed near an upper edge of the panel assembly 300. In addition, a plurality of gate driving ICs 440C1, 440C2, . . . are mounted in a column on the peripheral area of the panel assembly 300 and they are disposed near a left edge of the panel assembly 300.

A flexible printed circuit (FPC) film 511 is attached to the panel assembly 300 near the upper edge of the panel assembly 300. The FPC film 511 is connected to a printed circuit board (PCB) (not shown) mounting a plurality of circuit elements such as the signal controller 600, the gray voltage generator 800, etc. The FPC film 511 includes a plurality of signal lines 520 transmitting control signals and voltages from the PCB to the panel assembly 300. The signal lines 520 include a plurality of signal lines 522 transmitting voltages required for the gate driving ICs 440C1, 440C2, . . . and the data driving ICs 540L1-540L4 and 540R1-540R4, a plurality of signal lines 521 transmitting control signals for the gate driving ICs 440C1, 440C2, . . . , and a pair of a plurality of signal lines 523*a* and 523*b* transmitting control signals and image data for the data driving ICs 540L1-540L4 and 540R1-540R4.

The signals from the signal lines 523*a* and 523*b* of the FPC film 511 are transmitted to the data driving ICs 540L1-540L4 and 540R1-540R4 in a cascade way. In detail, the signals from the signal lines 523*a* and 523*b* are first transmitted to a pair of data driving ICs 540L1 and 540R1, which are located near a transverse center of the panel assembly 300, through lead lines 321 disposed on the panel assembly 300, respectively. The signals are then sequentially transferred to adjacent data driving ICs 540L2-540L4 and 540R2-540R4 through interconnections 541 in left and right directions, respectively.

The signals from the signal lines 522 are transmitted to the data driving ICs 540L1-540L4 and 540R1-540R4 through lead lines 322 disposed on the panel assembly 300 in a direct manner without passing through other data driving ICs 540L1-540L4 and 540R1-540R4. The signals from the signal lines 522 are also transmitted to the gate driving ICs 440C1, 440C2, . . . in a cascade way, but they may be transmitted in a direct manner. In detail, the signals from the signal lines 522 are transmitted to an uppermost gate driving IC 440C1 through lead lines 324 disposed on the panel assembly 300 and then sequentially transferred to adjacent gate driving ICs 440C2, . . . through interconnections 441.

The signals from the signal lines 521 are transmitted to the gate driving ICs 440C1, 440C2, . . . in a cascade way, but they may be transmitted in a direct manner. In detail, the signals from the signal lines 521 are first transmitted to the uppermost gate driving IC 440C1 through lead lines 323 disposed on the panel assembly 300. The signals are then sequentially transferred to adjacent gate driving ICs 440C2, . . . through the interconnections 441 in a lower direction. Some signals such as a scanning start signal may be inputted only to the uppermost gate driving IC 440C1, and some signals such as a carry signal may be transferred from a gate driving IC to a next gate driving IC instead of the scanning start signal.

FIG. 4 shows a left center data driving IC 540L1 and the lead lines 321 connected thereto. The lead lines 321 includes a plurality of lead lines 321L1-321L14 that extend in a longitudinal direction from the upper edge of the panel assembly 300 and then curved to the left to be connected to the data driving IC 540L1. The lead lines 321L1-321L14 have contact portions at their ends, which are connected to the data driving IC540L1. The contact portions near the driving IC 540L are representatively denoted by a reference numeral 329 and a reference numeral 329L1 indicates the contact portion of an uppermost lead line 321L1.

As shown in the figure, the wider the lead lines 321L1-321L14 becomes as the longer the lead lines 321L1-321L14 becomes, except for portions 328L1-328L14 disposed near the contact portions 329. Primary widths of the lead lines 321L1-321L14, i.e., the widths of main portions of the lead lines 321L1-321L14 other than the subsidiary portions 328L1-328L14 are denoted by a1-a14 and they satisfy a relation a1<a2<a3, . . . , <a12<a13<a14. However, the subsidiary portion 328L1-328L2 of each lead line 321L1-321L14, which has a length c1-c14, has a secondary width d1-d14 larger than a predetermined value. The predetermined value is determined in consideration of the prevention of the disconnection due to electrostatic discharge.

The lengths c1-c14 may be equal to each other, and the secondary widths d1-d14 may also be equal to each other. In this case, the secondary widths d1-14 may have a value equal to that of the primary width a14 of the widest lead line 321L14. Otherwise, some of the secondary widths d1-d14 of the portions 328L1-328L14 may be larger than the respective primary widths a1-a14, while the other of the secondary widths d1-d14 may be smaller than the respective primary widths a1-a14.

However, the secondary widths d1-d14 may be different from each other in consideration of the respective primary widths a1-a14.

In additions to the above-described conditions, it is preferable that the primary and the secondary widths a1-a14 and d1-d14 of the lead lines 321L1-321L14 are determined such that the resistances of all the lead lines 321L1-321L14 are equal to each other. For example, the lengths c1-c14 are equal to each other, the secondary widths d1-d14 are equal to each other, and the primary widths a1-a14 are determined such that other portions of the lead lines 321L1-321L14 except for the portions 328L1-328L14 have equal resistance.

The above-described configuration prevents the disconnection of narrow lead lines.

As described above, the panel assembly 300 includes the lower panel 100 and the upper panel 200. The lead lines 321-324 and the interconnections 541 are disposed on the lower panel 100, which will be described in detail with reference to FIGS. 5-8 along with FIG. 4.

Figure 5:
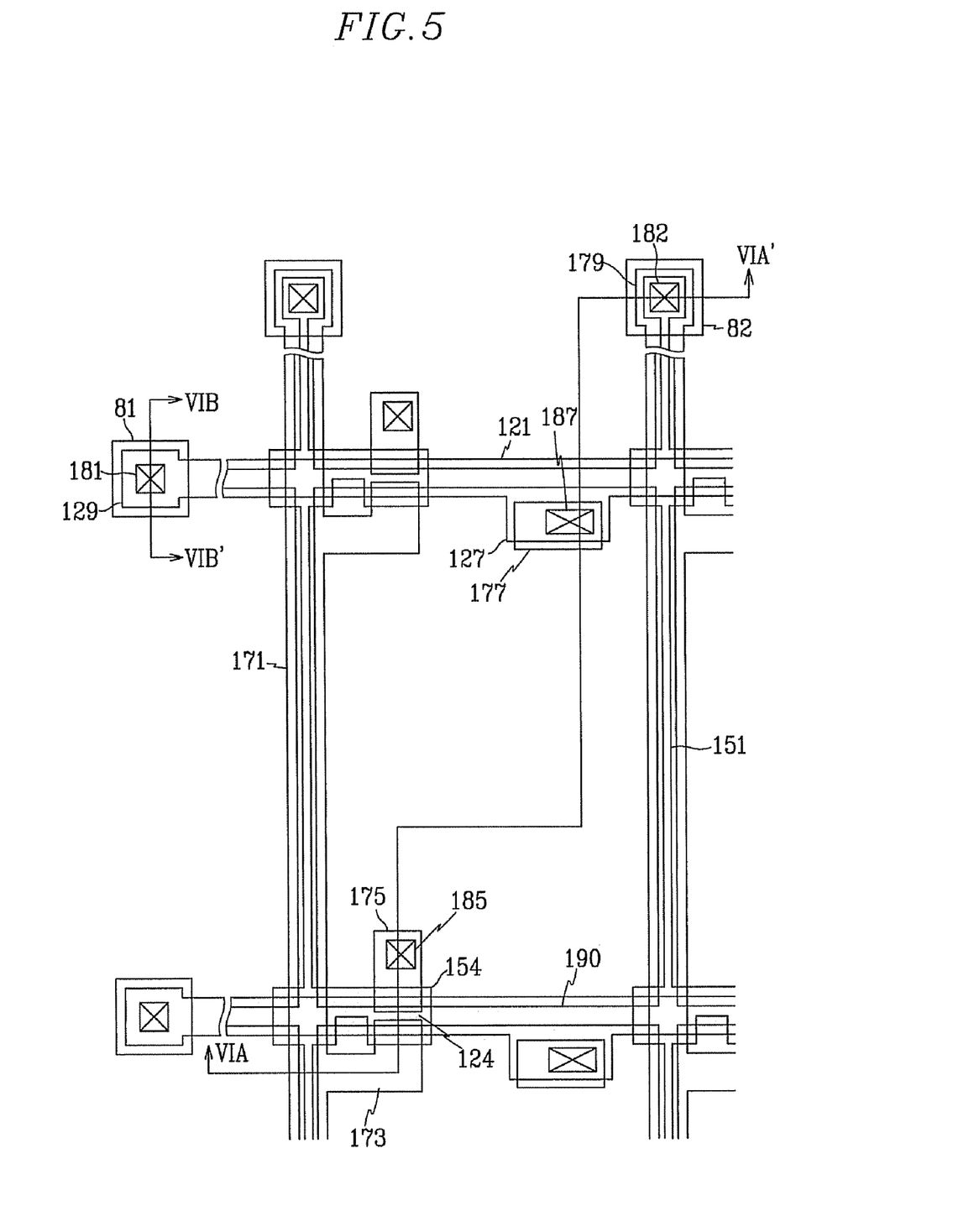
FIG. 5 is an exemplary layout view of the lower panel shown in FIGS. 1-4.
Figure 6A:
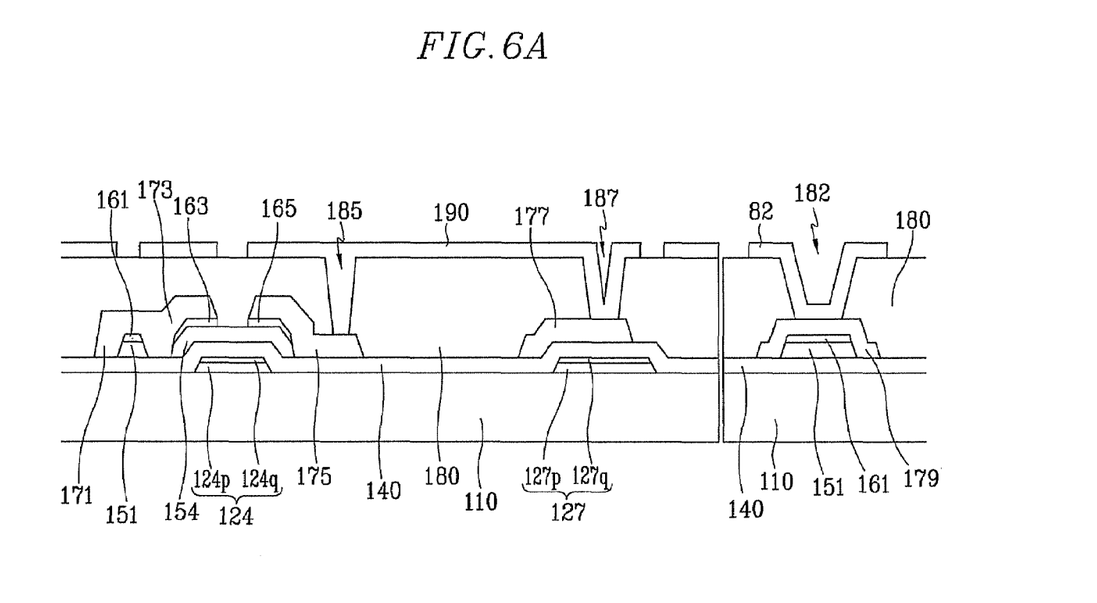
FIGS. 6A and 6B are sectional views of the lower panel shown in FIG. 5 taken along the lines VIA-VIA' and VIB-VIB'.
Figure 6B:
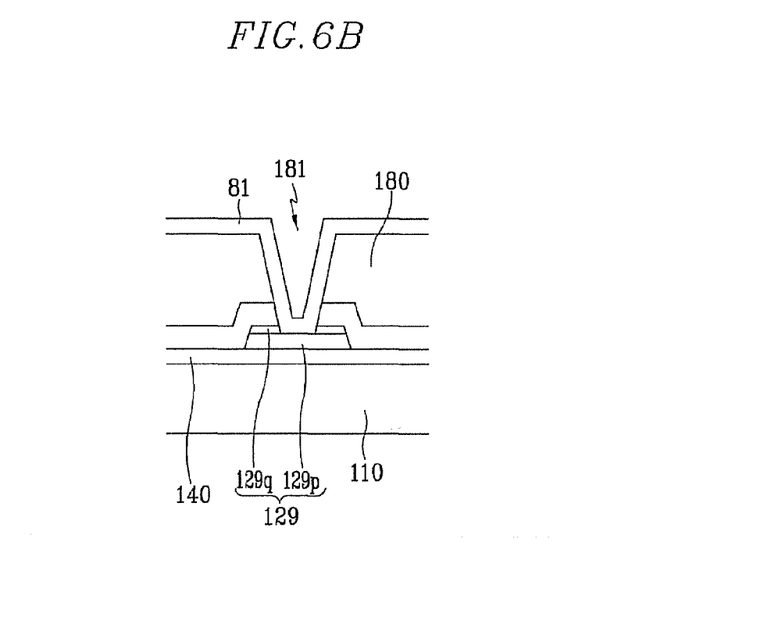
Figure 7:
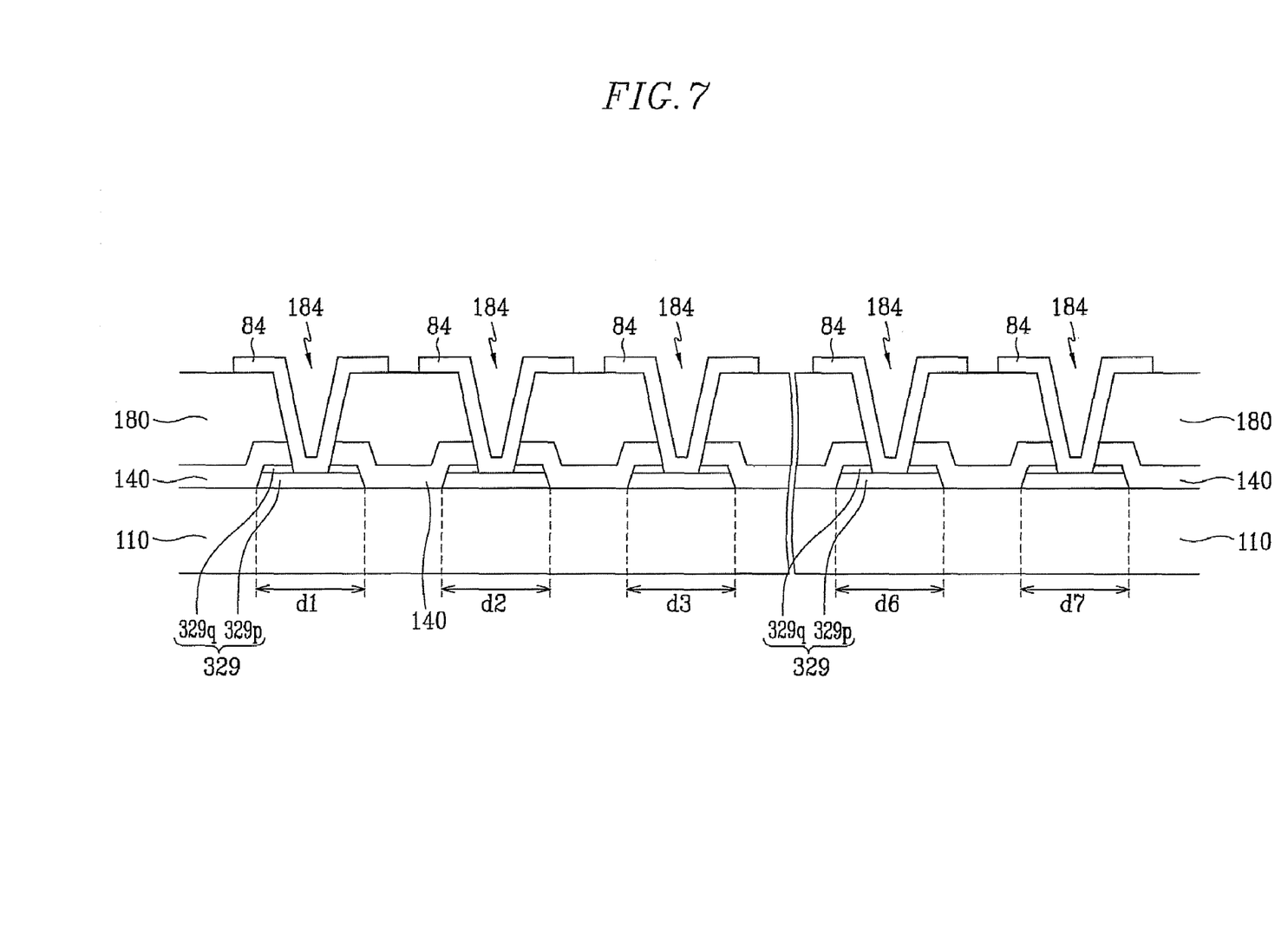
FIG. 7 is a sectional view of the lead lines shown in FIG. 4 taken along the line VII-VII'.
Figure 8:
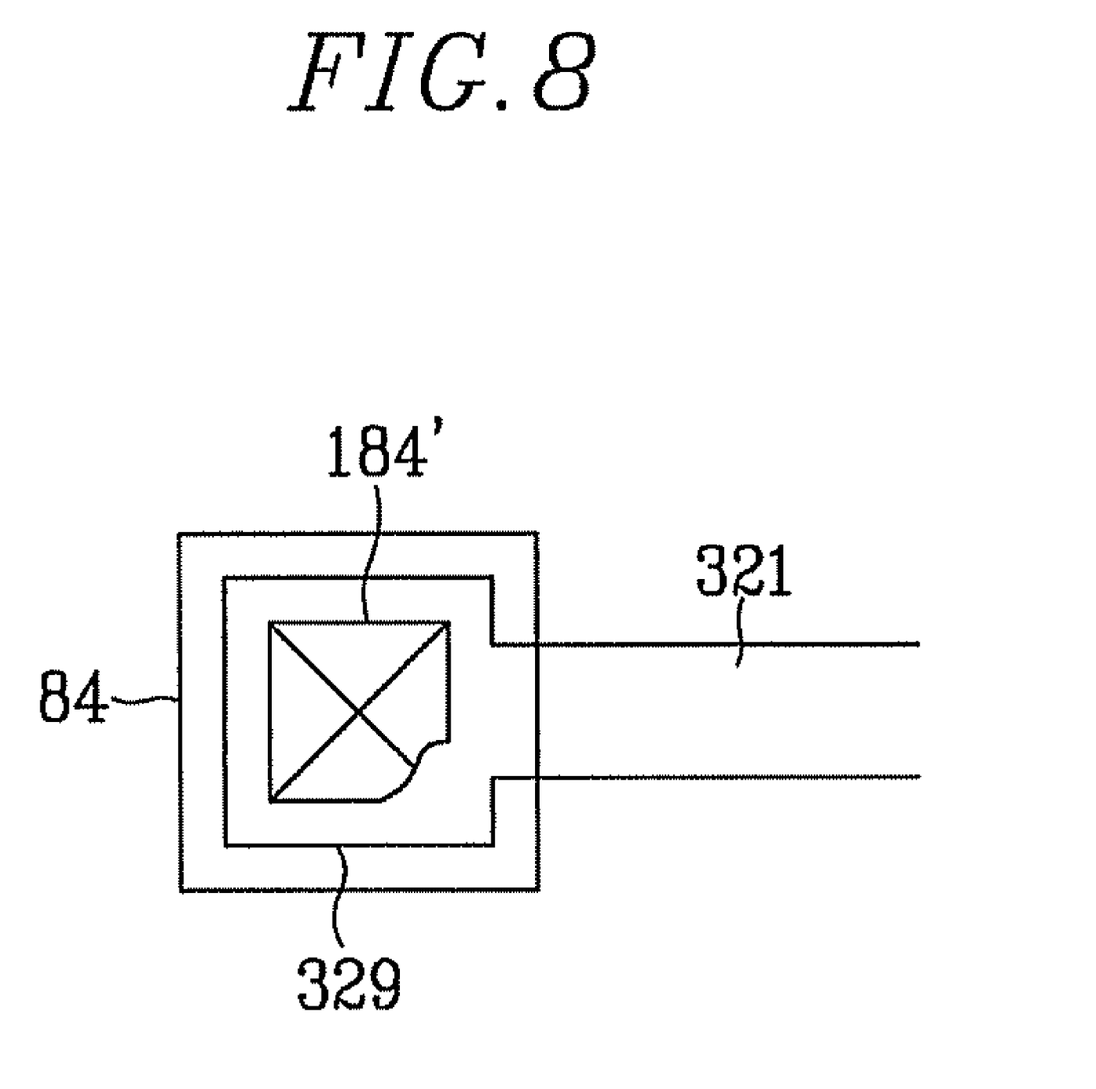
FIG. 8 is a layout view of an end portion of a lead line according to another embodiment of the present invention.

FIG. 5 is an exemplary layout view of the lower panel shown in FIGS. 1-4, FIGS. 6A and 6B are sectional views of the lower panel shown in FIG. 5 taken along the lines VIA-VIA' and VIB-VIB', FIG. 7 is a sectional view of the lead lines shown in FIG. 4 taken along the line VII-VII', and FIG. 8 is a layout view of an end portion of a lead line according to another embodiment of the present invention.

A plurality of gate lines 121 for transmitting gate signals and a plurality of lead lines 321L1-321L14 and 322 for transmitting voltages and signals from the FPC film 511 (shown in FIG. 3) to a data driving IC 540L1 are formed on an insulating substrate 110.

Each gate line 121 extends substantially in a transverse direction and a plurality of portions of each gate line 121 form a plurality of gate electrodes 124. Each gate line 121 includes a plurality of projections 127 protruding downward and an expanded end portion 129 having a large area for contact with another layer or an external device.

Each of the lead lines 321L1-321L14 and 322 has an expanded end portion disposed near the upper edge of the lower panel 100 and another expanded end portion 329 (329L1) disposed under the data driving IC 540L1. The end portions 329 of the lead lines 321L1-321L14 are disposed near a right edge of the data driving IC 540L1 and alternately arranged in a longitudinal direction. Similarly, the end portions of the lead lines 322 are disposed near an upper edge of the data driving IC 540L1 and alternately arranged in the transverse direction. The lead lines 321L1-321L14 and 322 extend downward from the upper edge of the panel assembly 300 and turn left to approach the data driving IC 540L1. As described above, the widths a1-a14 of the lead lines 321L1-321L14 except for portions 328L1-328L14 becomes wider as the lengths of the lead lines 321L1-321L14 becomes longer. In addition, the portions 328L1-328L14 may have equal width and distance.

The gate lines 121 and the lead lines 321L1-321L14 and 322 include two films having different physical characteristics, a lower film and an upper film. The upper film is preferably made of low resistivity metal including Al containing metal such as Al and Al alloy for reducing signal delay or voltage drop in the gate lines 121 and the lead lines 321L1-321L14 and 322. On the other hand, the lower film is preferably made of material such as Cr, Mo, Mo alloy, Ta and Ti, which has good physical, chemical, and electrical contact characteristics with other materials such as indium tin oxide (ITO) and indium zinc oxide (IZO). A good exemplary combination of the lower film material and the upper film material is Cr and Al—Nd alloy. In FIGS. 6A, 6B and 7, the lower and the upper films of the gate electrodes 124 are indicated by reference numerals 124$p$ and 124$q$, respectively, the lower and the upper films of the projections 127 of the gate lines 121 are indicated by reference numerals 127$p$ and 127$q$, respectively, the lower and the upper films of the end portions 129 of the gate lines 121 are indicated by reference numerals 129$p$ and 129$q$, respectively, and the lower and the upper films of the end portions 329 of the lead lines 321L1-321L14 are indicated by reference numerals 329$p$ and 329$q$, respectively. Portions of the upper film 129$q$/329$q$ of the end portions 129/329 of the gate lines 121/the lead lines 321L1-321L14 are removed to expose the underlying portions of the lower films 129$p$/329$p$ as shown in FIGS. 6B and 7.

However, the gate lines 121 may include a single layer preferably made of Al containing metal, Ag containing metal such as Ag and Ag alloy, Cu containing metal such as Cu and Cu alloy, Cr, Mo, Mo alloy, Ta, or Ti. Alternatively, the gate lines 121 may have a multi-layered structure.

In addition, the lateral sides of the gate lines 121 and the lead lines 321L1-321L14 and 322 are inclined relative to a surface of the substrate 110, and the inclination angle thereof ranges about 30-80 degrees.

A gate insulating layer 140 preferably made of silicon nitride (SiNx) is formed on the gate lines 121 and the lead lines 321L1-321L14 and 322.

A plurality of semiconductor stripes 151 preferably made of hydrogenated amorphous silicon (abbreviated to "a-Si") are formed on the gate insulating layer 140. Each semiconductor stripe 151 extends substantially in the longitudinal direction and has a plurality of projections 154 branched out toward the gate electrodes 124. The width of each semiconductor stripe 151 becomes large near the gate lines 121 such that the semiconductor stripe 151 covers large areas of the gate lines 121.

A plurality of ohmic contact stripes and islands 161 and 165 preferably made of silicide or n+ hydrogenated a-Si heavily doped with n type impurity are formed on the semiconductor stripes 151. Each ohmic contact stripe 161 has a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are inclined relative to a surface of the substrate 110, and the inclination angles thereof are preferably in a range between about 30-80 degrees.

A plurality of data lines 171, a plurality of drain electrodes 175, and a plurality of storage capacitor conductors 177 are formed on the ohmic contacts 161 and 165 and the gate insulating layer 140.

The data lines 171 for transmitting data voltages extend substantially in the longitudinal direction and intersect the gate lines 121. Each data line 171 includes an end portion 179 having a larger area for contact with another layer or an external device.

A plurality of branches of each data line 171, which project toward the drain electrodes 175, form a plurality of source electrodes 173. Each pair of the source electrodes 173 and the drain electrodes 175 are separated from each other and opposite each other with respect to a gate electrode 124. A gate electrode 124, a source electrode 173, and a drain electrode 175 along with a projection 154 of a semiconductor stripe 151 form a TFT having a channel formed in the projection 154 disposed between the source electrode 173 and the drain electrode 175.

The storage capacitor conductors 177 overlap the projections 127 of the gate lines 121.

The data lines 171, the drain electrodes 175, and the storage capacitor conductors 177 are preferably made of refractor metal including Cr, Mo, Ti, Ta or alloys thereof. They may include an upper film preferably made of Mo or Mo alloy and a lower film located thereon and preferably made of Al containing metal. Alternatively, the data lines 171, etc., include triple layers interposing a middle layer of Al or Al alloy.

Like the gate lines 121 and the lead lines 321L1-321L14 and 322, the data lines 171, the drain electrodes 175, and the storage capacitor conductors 177 have tapered lateral sides relative to a surface of the substrate 110, and the inclination angles thereof range about 30-80 degrees.

The ohmic contacts 161 and 165 are interposed only between the underlying semiconductor stripes 151 and the overlying data lines 171 and the overlying drain electrodes 175 thereon and reduce the contact resistance therebetween. The semiconductor stripes 151 include a plurality of exposed portions, which are not covered with the data lines 171 and the drain electrodes 175, such as portions located between the source electrodes 173 and the drain electrodes 175. Although the semiconductor stripes 151 are narrower than the data lines 171 at most places, the width of the semiconductor stripes 151 becomes large near the gate lines 121 as described above, to smooth the profile of the surface, thereby preventing the disconnection of the data lines 171.

A passivation layer 180 is formed on the data lines 171, the drain electrodes 175, the storage electrode capacitors 177, and exposed portions of the semiconductor stripes 151, which are not covered with the data lines 171 and the drain electrodes 175. The passivation layer 180 is preferably made of photosensitive organic material having a good flatness characteristic, low dielectric insulating material such as a-Si:C:O and a-Si:O:F formed by plasma enhanced chemical vapor deposition (PECVD), or inorganic material such as silicon nitride and silicon oxide. The passivation layer 180 may have a double-layered structure including a lower inorganic film and an upper organic film.

The passivation layer 180 has a plurality of contact holes 182, 185 and 187 exposing the end portions 179 of the data lines 171, the drain electrodes 175, and the storage conductors 177, respectively. The passivation layer 180 and the gate insulating layer 140 have a plurality of contact holes 181 and 184 exposing the lower film 129p of the end portions 129 of the gate lines 121 and the lower film 329p of the end portions 329 of the lead lines 321L1-321L14 and 322. The upper films 129q and 329q containing Al are removed preferably by wet etch.

A plurality of pixel electrodes 190 and a plurality of contact assistants 81, 82 and 84, which are preferably made of ITO or IZO, are formed on the passivation layer 180.

The pixel electrodes 190 are physically and electrically connected to the drain electrodes 175 through the contact holes 185 and to the storage capacitor conductors 177 through the contact holes 187 such that the pixel electrodes 190 receive the data voltages from the drain electrodes 175 and transmit the received data voltages to the storage capacitor conductors 177.

The pixel electrodes 190 supplied with the data voltages generate electric fields in cooperation with a common electrode (not shown) on another panel (not shown), which reorient liquid crystal molecules in a liquid crystal layer (not shown) disposed therebetween.

A pixel electrode 190 and a common electrode form a liquid crystal capacitor, which stores applied voltages after turn-off of the TFT. An additional capacitor called a "storage capacitor," which is connected in parallel to the liquid crystal capacitor, is provided for enhancing the voltage storing capacity. The storage capacitors are implemented by overlapping the pixel electrodes 190 with the gate lines 121 adjacent thereto (called "previous gate lines"). The capacitances of the storage capacitors, i.e., the storage capacitances are increased by providing the projections 127 at the gate lines 121 for increasing overlapping areas and by providing the storage capacitor conductors 177, which are connected to the pixel electrodes 190 and overlap the projections 127, under the pixel electrodes 190 for decreasing the distance between the terminals.

The pixel electrodes 190 overlap the gate lines 121 and the data lines 171 to increase aperture ratio but it is optional.

The contact assistants 81, 82 and 84 are connected to the exposed end portions 129, 179 and 329 of the gate lines 121, the data lines 171, and the lead lines 321L1-321L14 and 322 through the contact holes 181, 182 and 184, respectively. The contact assistants 81, 82 and 84 protect the exposed portions 129, 179 and 329 and complement the adhesion between the exposed portions 129, 179 and 329 and the driving ICs 440C1, 440C2, . . . , 540L1-540L4 and 540R1-540R4.

As described above, the exposed upper films 129q and 329q of the end portions 129 and 329 at the contact holes 181 and 184 are removed by wet etch to expose the lower films 129p and 329p. Although the wet etch may form undercut at sidewalls of the contact holes 181, and 184, which may cause the disconnection of the contact assistants 81 and 84 at least in part, the wide portions 328L1-328L14 gives large room for admitting electrostatic charges such that a disconnection due to the electrostatic charges can be prevented.

In addition, FIG. 8 shows a contact hole 184' having a curved edge for increasing the total length of the edges of the contact hole 184 to prevent the disconnection of the contact assistants 84 due to electrostatic discharge. The increase of the length of the edges of the contact holes 184 increases the contact length between the contact assistants 84 and the end portions 329. Accordingly, electrostatic discharge or heat introduced from the FPC film 511 into the lead lines 321L1-321L14 is more easily transferred to the contact assistants 84 and then to another device.

The pixel electrodes 190 may be made of transparent conductive polymer. For a reflective LCD, the pixel electrodes 190 are made of opaque reflective metal. In these cases, the contact assistants 81, 82 and 84 may be made of material such as ITO or IZO different from the pixel electrodes 190.

Now, the operation of the above-described LCD will be described in detail.

The signal controller 600 is supplied with input image signals R, G and B and input control signals controlling the display thereof such as a vertical synchronization signal Vsync, a horizontal synchronization signal Hsync, a main clock MCLK, and a data enable signal DE, from an external graphics controller (not shown). After generating gate control signals CONT1 and data control signals CONT2 and processing the image signals R, G and B suitable for the operation of the panel assembly 300 on the basis of the input control signals and the input image signals R, G and B, the signal controller 600 transmits the gate control signals CONT1 to the gate driver 400, and the processed image signals R', G' and B' and the data control signals CONT2 to the data driver 500, through the signal lines 521-523b and the lead lines 321-324.

The gate control signals CONT1 include a scanning start signal STV for instructing to start scanning and at least a clock signal for controlling the output time of the gate-on voltage Von. The gate control signals CONT1 may further include an output enable signal OE for defining the duration of the gate-on voltage Von.

The data control signals CONT2 include a horizontal synchronization start signal STH for informing of start of a horizontal period, a load signal LOAD for instructing to apply the data voltages to the data lines $D_1$-$D_m$, a inversion control signal RVS for reversing the polarity of the data voltages (with respect to the common voltage Vcom), and a data clock signal HCLK.

The data driver 500 receives a packet of the image data R', G' and B' for a pixel row from the signal controller 600 and converts the image data R', G' and B' into analog data voltages selected from the gray voltages supplied from the gray voltage generator 800 in response to the data control signals CONT2 from the signal controller 600. Thereafter, the data driver 500 applies the data voltages to the data lines D1-Dm.

Responsive to the gate control signals CONT1 from the signal controller 600, the gate driver 400 applies the gate-on voltage Von to the gate line $G_1$-$G_n$, thereby turning on the switching elements Q connected thereto. The data voltages applied to the data lines D1-Dm are supplied to the pixels through the activated switching elements Q.

The difference between the data voltage and the common voltage Vcom is represented as a voltage across the LC capacitor $C_{LC}$, i.e., a pixel voltage. The LC molecules in the LC capacitor $C_{LC}$ have orientations depending on the magnitude of the pixel voltage, and the molecular orientations determine the polarization of light passing through the LC layer 3. The polarizer(s) converts the light polarization into the light transmittance.

By repeating this procedure by a unit of the horizontal period (which is indicated by 1H and equal to one period of the horizontal synchronization signal Hsync and the data enable signal DE), all gate lines $G_1$-$G_n$ are sequentially supplied with the gate-on voltage Von during a frame, thereby applying the data voltages to all pixels. When the next frame starts after finishing one frame, the inversion control signal RVS applied to the data driver 500 is controlled such that the polarity of the data voltages is reversed (which is called "frame inversion"). The inversion control signal RVS may be also controlled such that the polarity of the data voltages flowing in a data line in one frame are reversed (for example, line inversion and dot inversion), or the polarity of the data voltages in one packet are reversed (for example, column inversion and dot inversion).

The above descriptions may be adapted to other flat panel display devices such as OLED.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A display panel adapted to mounting a driving chip, the display panel comprising:
   a plurality of gate lines;
   a plurality of data lines;
   a plurality of switching elements connected to the gate lines and the data lines;
   a plurality of pixel electrodes connected to the switching elements; and
   a plurality of lead lines, each lead line including a first contact portion to be connected to the driving chip, a second contact portion to be connected to an external device, a main portion connected to the second contact portion, and a subsidiary portion connected between the first contact portion and the main portion,
   wherein the lead lines have different lengths, the main portions of the lead lines have different widths in direct proportion to the different lengths, and the subsidiary portions of the lead lines have substantially the same width and length.

2. The display panel of claim 1, wherein the lead lines have substantially the same resistance.

3. The display device of claim 2, wherein each of the lead lines comprises a lower film and an upper film and the upper film of the contact portion of each of the lead lines has an opening exposing a portion of the lower film.

4. The display device of claim 3, further comprising:
   an insulating layer formed on the lead lines and having contact holes exposing the exposed portions of the lower films of the contact portions; and
   a plurality of contact assistants formed on the insulating layer and contacting the exposed portions of the lower films of the contact portions through the contact holes.

5. The display device of claim 4, wherein the upper films are undercut at the contact holes.

6. The display device of claim 5, wherein the contact holes have curved edges.

* * * * *